May 28, 1940.  M. E. BERGER  2,202,184
PULLEY BLOCK
Filed Oct. 25, 1937
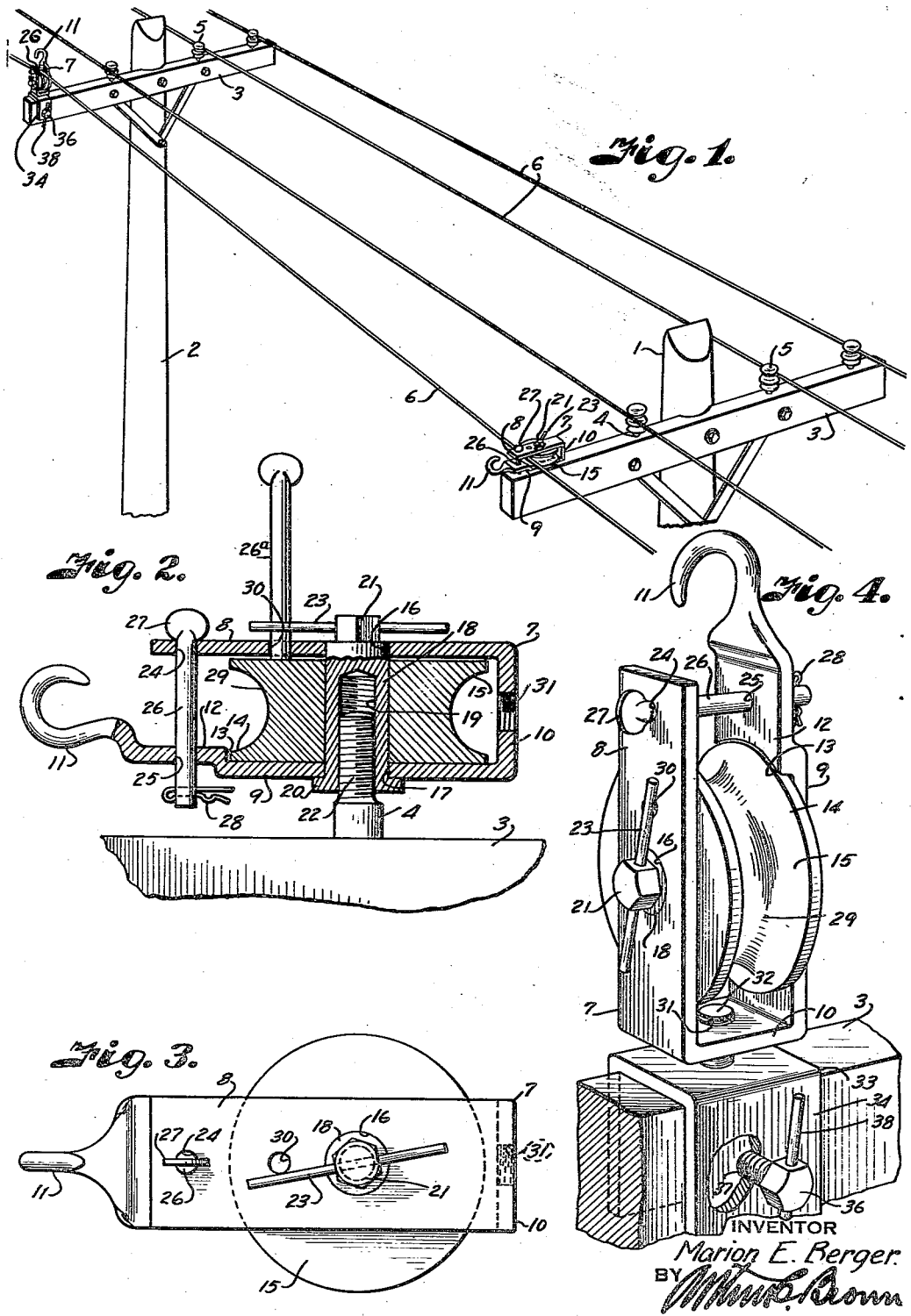
INVENTOR
Marion E. Berger.
BY
ATTORNEY Patented May 28, 1940

2,202,184

UNITED STATES PATENT OFFICE 2,202,184

PULLEY BLOCK

Marion E. Berger, Lewistown, Mo.

Application October 25, 1937, Serial No. 170,865

3 Claims. (Cl. 175—376)

This invention relates to pulley blocks and more particularly to a pulley block designed for universal application and adapted to be mounted on an electric power line supporting pole, or the like, to facilitate tensioning of such lines in stringing the same across country or between poles or other supports.

The principal objects of the present invention are to provide a pulley block which may be swivelly or rotatably mounted on a line support and to provide for either utilizing a conventional insulator stud for supporting the pulley block or mounting the pulley block on the cross arm customarily supporting such insulator studs.

Other important objects of the present invention are to provide a pulley block with a member adapted to rotatably mount the pulley in the block and to adapt such pin for rotatably mounting the block on a support independently of rotation of the pulley; to provide for turning the pin; to provide for retaining the pin in desired position on the support; and to provide an attachment for the pulley block capable of swivelly mounting the pulley block on a support.

In accomplishing these and other objects of the present invention, I have provided improved details of structure, the preferred forms of which are illustrated in the accompanying drawing wherein:

Fig. 1 is a perspective view of a pair of power line supporting poles equipped with pulley blocks embodying the features of the present invention.

Fig. 2 is a detail longitudinal cross-section substantially through the center of the pulley block, particularly illustrating application of the pulley supporting pin to the block and support.

Fig. 3 is a plan view of the pulley block.

Fig. 4 is a detail perspective view of the pulley block illustrating the application thereto of a clamping attachment for securing the same to a support.

Referring more in detail to the drawing:

1 and 2 designate poles or the like having conventional cross arms 3 thereon provided with insulator studs 4, Fig. 2, mounted in the cross arms, and which ordinarily support line insulators 5 on which the electric power lines 6 or the like are ordinarily tensioned in stringing the lines between the poles to a predetermined destination.

In carrying out the present invention, and in order to facilitate tensioning the lines, I remove one or more of the insulators 5 and apply my improved pulley block 7 to the insulator studs 4 in place of an insulator.

The insulator block preferably consists of a substantially U-shaped bracket having arms 8 and 9 and an end member 10, a conventional hook member 11 being provided on the arm 9 of the bracket for suspending the pulley block in the usual manner when desired. The arm 9 is further preferably provided with an inset portion 12 having an arcuate inner face 13, Fig. 4, for overlying one side 14 of a pulley 15, which is rotatably mounted in the bracket.

A pair of aligned apertures 16 and 17 are provided in the arms 8 and 9 in spaced relation to the ends thereof for receiving a bearing member 18 therein, the bearing member being provided with a threaded bore 19 opening from one end thereof, which end is provided with an annular, laterally extending flange 20 forming a stop for engagement with the arm 9 for limiting insertion of the bearing member 18 relative to the bracket. The pulley 15 is rotatably mounted on the bearing member 18, which serves as a spindle for the pulley. The end of the bearing member opposite the annular flange 20 is provided with a reduced and squared end 21 for receiving a wrench or the like for turning the threaded bearing member down on the threads 22 of the insulator stud 4, as shown in Fig. 2. In order to facilitate turning the bearing member, I provide the squared end 21 thereof with a through passage, and extend a bar 23 therethrough, it being apparent that the bar 23 may be easily turned to adjust the bearing member bracket and pulley in desired spaced relation to the cross arm 3 of the pole.

The arms 8 and 9 of the bracket are further provided with a pair of aligned openings or apertures 24 and 25 spaced from the boss openings toward the ends of the arms and a retaining device 26 having a head 27 and having a fastening device 28 is mounted in the openings 24 and 25 to prevent accidental displacement of a line, wire or the like 6 extending over the run 29 of the pulley 15.

The pin 26 serves the further purpose of being susceptible of extraction from engagement in its aligned holes and for application to the arm 8 of the bracket in an opening 30 therein adjacent the bearing member 18, as shown in Fig. 2, in which case it may be considered a retaining member 26a for the rod 23 it being apparent that the rod 23 may be turned to adjust the bearing member and the pin 26a thereafter applied to the hole 30 in such a manner that the rod 23 may bear thereagainst and prevent unintended turning of the bearing member.

An opening 31 is also provided in the end member 10 of the bracket. This opening is for the purpose of receiving a threaded stud 32, which is mounted on a clamping member 33, as shown in Fig. 4, the clamping member having side arms 34 engageable over a cross arm 35 of a pole or the like and one of the arms 34 is provided with a tensioning device 36, which consists of a set screw 37 extendible through the arm for engagement with the cross arm, a turning pin or the like 38 being provided in the head of the tensioning device 36 to facilitate engagement of the pin with the cross arm for effectively clamping the pulley block thereto.

The use and operation of a pulley block constructed as described is as follows:

Assuming a power line supporting pole to be provided with a cross arm and insulator studs, the pulley block 7 is applied to such studs by threading the bearing member 18 thereon. The pulley 15 is then inserted between the arms 8 and 9 of the bracket and the central axial opening thereof aligned with the holes 16 and 17 in the arms of the bracket. The pulley block and pulley, as a unit, is then sleeved over the bearing member 18, it being apparent that the pulley is rotatable on the spindle boss 18 and that the bracket is rotatable on the spindle independently of the pulley. A line 6 is then threaded on the pulley and the pin 26 applied to its aligned holes for retaining the line against accidental displacement.

When the line is being tensioned, it is desirable to adjust the pulley block vertically on the insulator stud and the rod 23 is then applied to the squared end of the bearing member for turning the same down on the insulator stud. The pin 26 may then be removed from its aligned seats in the bracket and applied to the hole 30 to the end that accidental rotation of the rod and consequent maladjustment of the bearing member 18 is therefore prevented. The line may then be tensioned as desired.

It is sometimes desirable to apply the pulley block to a support in vertically extending condition and, when such occasion arises, the pulley block is threaded on the stud 32 of the clamping member 33 by threading the bracket on the stud by means of the threaded hole 31 in the end thereof. The clamping member 33 may then be easily and quickly applied to the cross arm 35 by merely sleeving the arms 34 over the cross arm and tensioning the set screw 37 into engagement with the cross arm by turning the set screw pin 38.

The principal advantages in a pulley block constructed as described are that independent swivelling action is obtained for the pulley and pulley block, respectively. The pulley block may be maintained in any desired position on an insulator stud or in any angular position on the cross arm of a power line supporting pole. Further, many variations in line tensioning requirements are adequately met by the laterally and vertically arranged mountings for the pulley block relative to its support, as well as the customary hook mounting member thereof, thereby rendering the pulley block suitable for universal application to many kinds of supports.

What I claim and desire to secure by Letters Patent is:

1. A pulley block including a bracket having aligned openings therein, a member mounted in said openings having a bore therein, a pulley rotatably mounted on said member, means engageable in the bore of the member for supporting the bracket, and means mounted on said member for facilitating turning the member relative to the support independently of the block.

2. A pulley block including a bracket having a pair of aligned holes therein, a pin mounted in said aligned holes having a bore therein, a pulley rotatably mounted on said pin, means engageable in the bore of the pin for supporting the bracket, said bracket having a pair of aligned openings, and a member removably mounted in said aligned openings normally forming a retaining device for a line mounted on said pulley.

3. A pulley block including a bracket having a pair of aligned holes therein, a pin mounted in said aligned holes having a bore therein, a pulley rotatably mounted on said pin, means engageable in the bore of the pin for supporting the bracket, a rod mounted on said pin for facilitating turning the pin relative to the support, said bracket having an aperture adjacent said rod, and a member engageable in said aperture and against said rod for retaining the pin and block in desired rotated position.

MARION E. BERGER.